US012724151B2

(12) United States Patent
Ashida

(10) Patent No.: US 12,724,151 B2
(45) Date of Patent: Sep. 1, 2026

(54) OPTICAL SCANNING APPARATUS, OBJECT RECOGNITION APPARATUS AND OPTICAL SCANNING METHOD

(71) Applicant: SCREEN HOLDINGS CO., LTD., Kyoto (JP)

(72) Inventor: Yuki Ashida, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 958 days.

(21) Appl. No.: 17/925,485

(22) PCT Filed: Apr. 26, 2021

(86) PCT No.: PCT/JP2021/016628
§ 371 (c)(1),
(2) Date: Nov. 15, 2022

(87) PCT Pub. No.: WO2021/235185
PCT Pub. Date: Nov. 25, 2021

(65) Prior Publication Data

US 2023/0184941 A1 Jun. 15, 2023

(30) Foreign Application Priority Data

May 22, 2020 (JP) ................................. 2020-089978

(51) Int. Cl.
*G01S 17/32* (2020.01)
*G01S 7/48* (2006.01)
(Continued)

(52) U.S. Cl.
CPC ............ *G01S 17/32* (2013.01); *G01S 7/4808* (2013.01); *G01S 7/4817* (2013.01); *G01S 7/4863* (2013.01); *G02B 3/0006* (2013.01)

(58) Field of Classification Search
CPC ...... G01S 17/32; G01S 7/4808; G01S 7/4817; G01S 7/4863; G01S 7/4917; G01S 17/42; G01S 17/34; G02B 3/0006; G02B 26/106
See application file for complete search history.

(56) References Cited

U.S. PATENT DOCUMENTS 6,634,750 B2 * 10/2003 Neal .................. G01M 11/0264 351/211
10,061,019 B1 8/2018 Campbell et al.
(Continued)

FOREIGN PATENT DOCUMENTS

CN 1670508 B 11/2011
CN 110622032 A 12/2019
(Continued)

OTHER PUBLICATIONS

Extended European Search Report issued in corresponding European Patent Application No. 21809375.5, dated May 23, 2024.
(Continued)

*Primary Examiner* — Michael Lee
(74) *Attorney, Agent, or Firm* — Rimon P.C.

(57) ABSTRACT

The spatial phase modulation element is a so-called grating light valve for modulating the phase of light by displacing the ribbons. If the measurement light beam Lm (measurement light) is incident on such a spatial phase modulation element, the measurement light beam Lm is emitted in a direction corresponding to the displacement mode of the ribbons. That is, an emission direction of the measurement light beam Lm can be changed, and the measurement light beam Lm can be scanned across the object J by controlling the displacement mode of the ribbons. At this time, the measurement light beam Lm phase-modulated by the spatial phase modulation element is projected to the object J after
(Continued)

being shaped into a linear beam. That is, the linear measurement light beam Lm is scanned across the object J.

7 Claims, 8 Drawing Sheets

(51) Int. Cl.

| | |
|---|---|
| ***G01S 7/481*** | (2006.01) |
| ***G01S 7/4863*** | (2020.01) |
| ***G02B 3/00*** | (2006.01) |

(56) References Cited

U.S. PATENT DOCUMENTS

| | | | | |
|---|---|---|---|---|
| 2002/0185535 | A1 | 12/2002 | Tsikos et al. | |
| 2005/0206906 | A1 | 9/2005 | Chan et al. | |
| 2006/0227317 | A1 | 10/2006 | Henderson et al. | |
| 2009/0252537 | A1 | 10/2009 | Choi et al. | |
| 2010/0135547 | A1 | 6/2010 | Lee et al. | |
| 2010/0253995 | A1 | 10/2010 | Reichelt | |
| 2013/0342849 | A1* | 12/2013 | Shioda | G01B 11/2441 356/511 |
| 2014/0022554 | A1* | 1/2014 | Lim | G01B 9/0201 356/450 |
| 2018/0284279 | A1 | 10/2018 | Campbell et al. | |
| 2019/0250254 | A1 | 8/2019 | Campbell et al. | |
| 2019/0265337 | A1 | 8/2019 | Zhang et al. | |
| 2020/0033452 | A1 | 1/2020 | Takagawa et al. | |
| 2021/0063573 | A1* | 3/2021 | Suzuki | G01S 7/4917 |
| 2021/0396880 | A1* | 12/2021 | Yamauchi | G01B 9/02004 |

FOREIGN PATENT DOCUMENTS

| | | | |
|---|---|---|---|
| JP | 2001-41706 | A | 2/2001 |
| JP | 2011-501211 | A | 1/2011 |
| JP | 2019-535014 | A | 12/2019 |
| JP | 2020-016481 | A | 1/2020 |
| TW | I414818 | B | 11/2013 |
| WO | 2018/055449 | A2 | 3/2018 |
| WO | 2019/031327 | A1 | 2/2019 |

OTHER PUBLICATIONS

Y. Wang, et al. "Large-scale MEMS-actuated 2-D optical phased arrays," 2018 IEEE Micro Electro Mechanical Systems (MEMS), Belfast, UK, 2018, pp. 21-24, doi: 10.1109/MEMSYS.2018.8346471.

International Search Report issued in corresponding International Patent Application No. PCT/JP2021/016628, dated Jul. 20, 2021 with English translation.

Taiwanese Office Action issued in corresponding Taiwanese Patent Application No. 110116356, dated May 19, 2022.

Office Action dated May 28, 2025, issued in corresponding Chinese Application No. 202180032902.1, 16 pages.

* cited by examiner

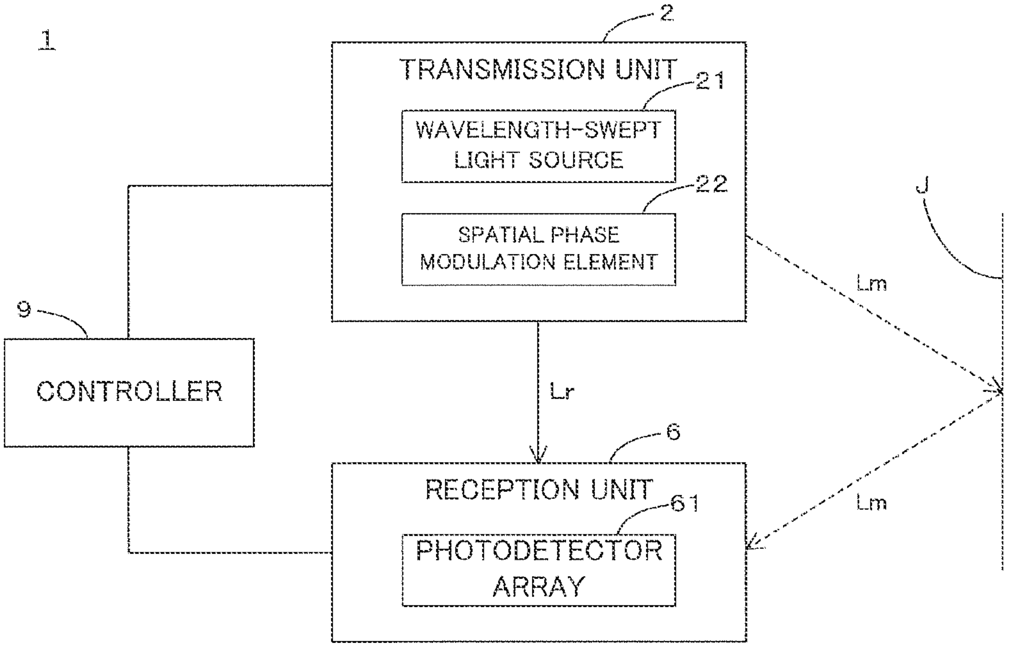
F I G. 1

F I G. 3
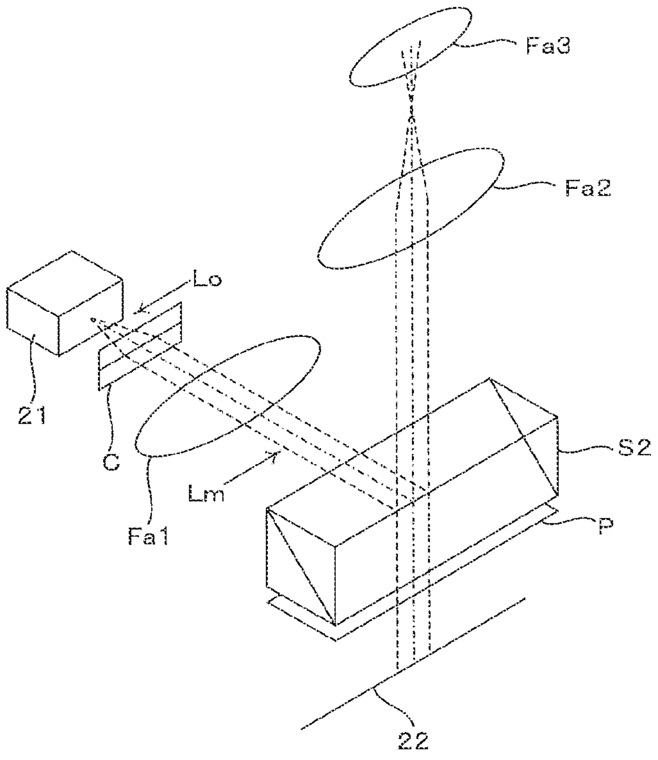

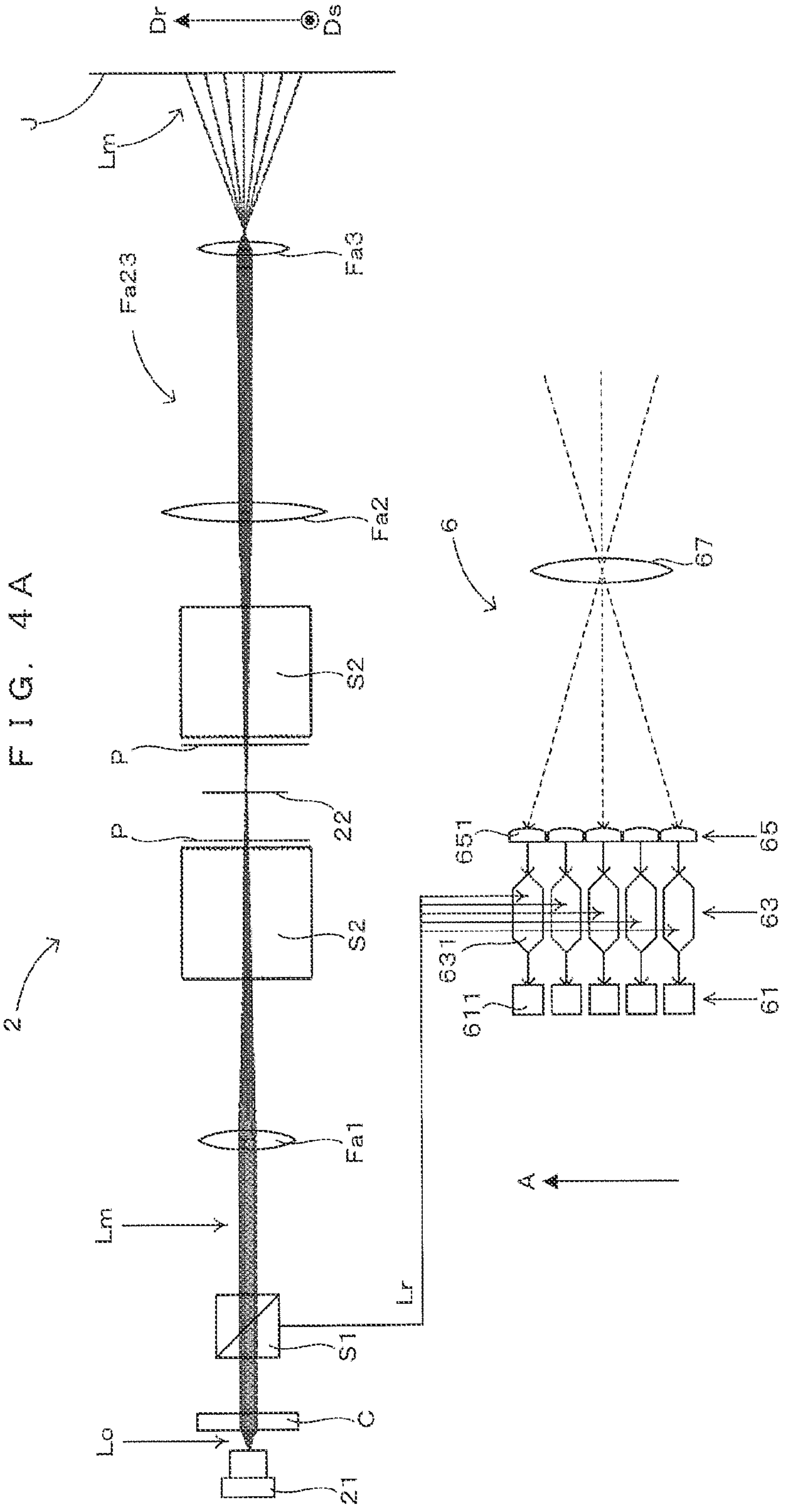
F I G. 4 A
Dr
Ds
J
Lm
Fa3
Fa23
Fa2
6
67
S2
P
22
P
S2
2
651
65
63
631
611
61
Fa1
A
Lm
Lr
S1
C
Lo
21

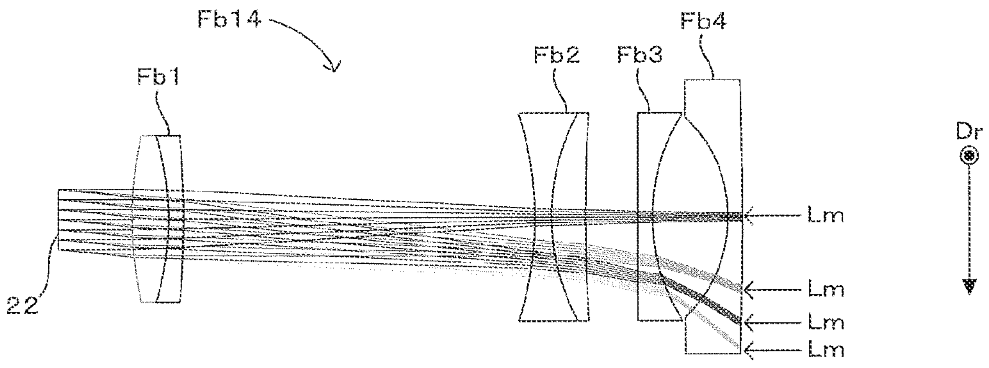
F I G. 5

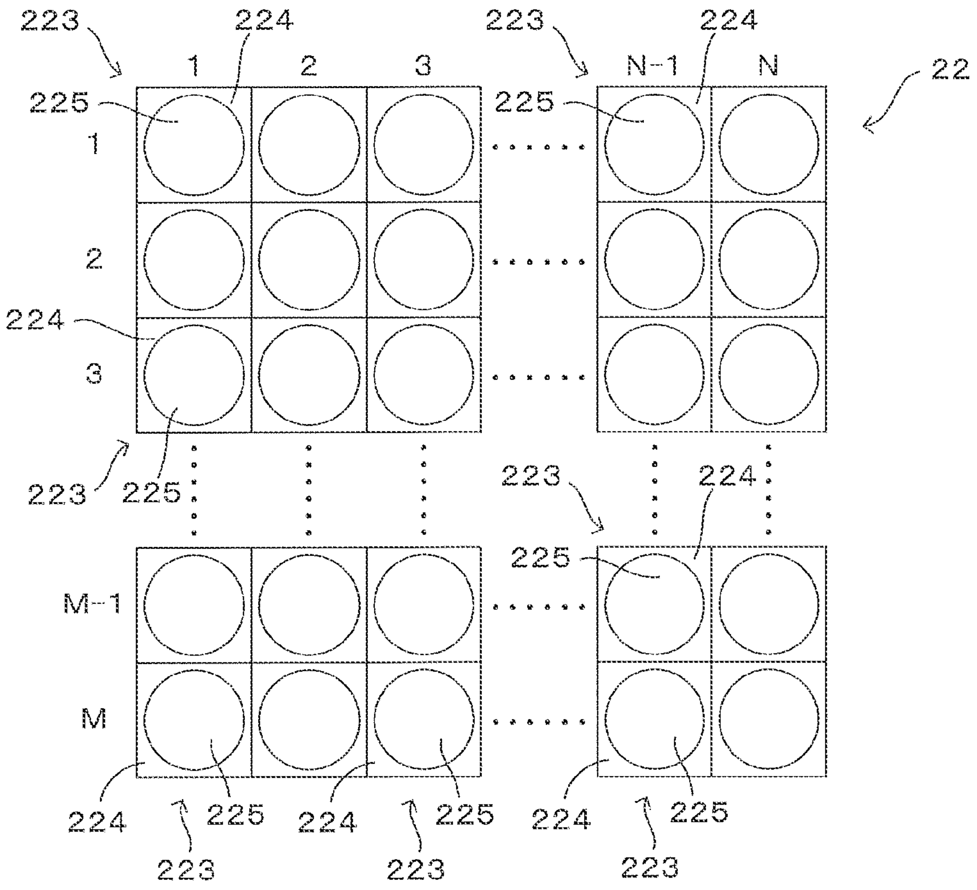
F I G. 6

OPTICAL SCANNING APPARATUS, OBJECT RECOGNITION APPARATUS AND OPTICAL SCANNING METHOD

CROSS REFERENCE TO RELATED APPLICATIONS

This application is the U.S. National Phase under 35 U.S.C. § 371 of International Application No. PCT/JP2021/016628, filed on Apr. 26, 2021, which claims the benefit of Japanese Application No. 2020-089978, filed on May 22, 2020, the entire contents of each are hereby incorporated by reference.

TECHNICAL FIELD

This invention relates to a technique for recognizing an object by detecting light reflected by the object while sweeping a wavelength of the light projected to the object, e.g. a technique used in LiDAR (Light Detection and Ranging, Laser Imaging Detection and Ranging) and the like.

BACKGROUND

Conventionally, in recognizing an object, for example, by LiDAR or the like, an FMCW (Frequency Modulated Continuous Wave) is used. This FMCW measures a distance to the object based on a detection result of light reflected by the object by photodetectors while projecting light whose wavelength is swept to the object.

To recognize an object present, for example, around a vehicle or the like using such a technique, light needs to be two-dimensionally scanned across the object. Such two-dimensional scanning of light can be performed by a MEMS (Micro Electro Mechanical Systems) mirror disclosed, for example, in patent literature 1. This MEMS mirror can rotate about each of two axes orthogonal. Light is scanned in a main scanning direction (main scanning) by causing the MEMS mirror to reflect the light while rotating the MEMS mirror about one axis. In this main scanning, the light incident on the object is reflected toward the MEMS mirror, further reflected to photodetectors by the MEMS mirror, and detected by the photodetectors. By repeating main scanning while rotating the MEMS mirror about the other axis and displacing the position of the light in a sub scanning direction, the light can be two-dimensionally scanned.

CITATION LIST

Patent Literature

[PTL 1] JP2020-016481

SUMMARY

Technical Problem

In such two-dimensional scanning of the light using the MEMS mirror, main scanning is repeated while the position of the light is displaced in the sub scanning direction. Thus, scanning requires time.

This invention was developed in view of the above problem and aims to provide a technique enabling a time required for two-dimensional scanning of light to be suppressed.

Solution to Problem

An optical scanning apparatus according to the invention, comprises: a wavelength-swept light generator that generates reference light and measurement light each having a wavelength continuously changing; a spatial phase modulation element including a plurality of grating elements reflecting the measurement light, the spatial phase modulation element performing phase modulation for the measurement light by displacing the grating elements; a projection optical system that projects the measurement light linearly extending to an object by shaping the measurement light phase-modulated by the spatial phase modulation element into linear shape; and a light receiver including a plurality of linearly arrayed photodetectors, the light receiver introducing the measurement light reflected by the object to the plurality of photodetectors, the light receiver introducing the measurement light superimposed on the reference light to the plurality of photodetectors, the plurality of photodetectors detecting the superimposed reference light and measurement light, and the spatial phase modulation element scanning the measurement light across the object by controlling a displacement of each of the plurality of grating elements.

An optical scanning method according to the invention, comprises: generating reference light and measurement light each having a wavelength continuously changing; performing phase modulation for the measurement light by displacing a grating element of a spatial phase modulation element including a plurality of grating elements reflecting the measurement light; projecting the measurement light linearly extending to an object by shaping the measurement light phase-modulated into linear shape; superimposing the measurement light reflected by the object and the reference light; and detecting the superimposed measurement light and reference light by a plurality of linearly arrayed photodetectors, the measurement light being scanned across the object by controlling a displacement of each of the plurality of grating elements of the spatial phase modulation element.

In the invention (optical scanning apparatus and optical scanning method) thus configured, the spatial phase modulation element including the plurality of grating elements is used. This spatial phase modulation element performs phase modulation for light by displacing the grating elements. If the measurement light is incident on such a spatial phase modulation element, the measurement light is emitted in a direction corresponding to a displacement mode of the grating elements. That is, an emission direction of the measurement light can be changed, and the measurement light can be scanned across the object by controlling the displacement mode of the grating elements. At this time, the measurement light phase-modulated by the spatial phase modulation element is projected to the object after being shaped into linear shape. That is, the linear measurement light is scanned across the object. To correspond to this, the plurality of linearly arrayed photodetectors is provided, and the linear measurement light reflected by the object is detected by the plurality of photodetectors. Therefore, the measurement light can be scanned at once for detection across a range having a length of the linear measurement light and a scanning width of the measurement light. In this way, it is possible to suppress a time required for two-dimensional scanning of light.

Further, the following advantages can be expected by scanning light by the spatial phase modulation element. That is, if an attempt is made to scan light using a MEMS mirror, a possibility that it becomes difficult to properly scan the light is assumed due to the rotation of the MEMS mirror during a period in which a wavelength of the measurement light is continuously changing. In contrast, the spatial phase modulation element has no such possibility since the spatial phase modulation element can precisely stop the grating elements with a desired displacement amount. Further, since the displacement amounts of the grating elements can be changed at a relatively high speed, the measurement light can be scanned at a high speed by instantaneously changing the displacement mode of the grating elements. As a result, it can be expected that the time required for two-dimensional scanning of light can be more reliably suppressed.

The optical scanning apparatus may be configured so that the projection optical system projects the measurement light linearly extending in an extending direction by collimating the measurement light in a viewpoint from the extending direction while spreading the measurement light in the extending direction. This enables the linear measurement light constituted by collimated light to be scanned across the object.

The optical scanning apparatus may be configured so that the light receiver includes a plurality of lenses linearly arrayed to respectively correspond to the plurality of photodetectors, the measurement light reflected by the object is incident on the plurality of lenses, and the lens introduces the incident measurement light to the corresponding photodetector. In such a configuration, the linear measurement light reflected by the object can be precisely introduced to each of the plurality of photodetectors.

The optical scanning apparatus may be configured so that the light receiver further includes a plurality of light combiners linearly arrayed to respectively correspond to the plurality of photodetectors, and the light combiner introduces the measurement light and the reference light to the corresponding photodetector after superimposing the reference light on the measurement light transmitted through the lens corresponding to the same photodetector. In such a configuration, the linear measurement light reflected by the object can be precisely introduced to each of the plurality of photodetectors while being superimposed on the reference light.

The optical scanning apparatus may further comprises an irradiation optical system provided between the wavelength-swept light generator and the spatial phase modulation element, the plurality of grating elements are arrayed in an array direction, the grating element is shaped to extend in a longitudinal direction orthogonal to the array direction, and the irradiation optical system converges the measurement light to the spatial phase modulation element in the longitudinal direction and collimates the measurement light to the spatial phase modulation element in a viewpoint from the longitudinal direction. In such a configuration, the measurement light is converged to the plurality of grating elements of the spatial phase modulation element. Therefore, the measurement light can be narrowed to ranges of the grating elements whose displacements are controlled with relatively high accuracy, and the measurement light can be precisely emitted in a desired direction from the spatial phase modulation element.

An object recognition apparatus according to the invention, comprises: the above optical scanning apparatus; and a controller that calculates a positional relationship with an object based on a detection result of the plurality of photodetectors provided in the optical scanning apparatus. Therefore, it is possible to suppress a time required for two-dimensional scanning of light.

Advantageous Effects of Invention

As described above, according to the invention, it is possible to suppress a time required for two-dimensional scanning of light.

BRIEF DESCRIPTION OF DRAWINGS

FIG. 1 is a block diagram showing an object recognition apparatus according to the invention.

FIG. 3 is a perspective view schematically showing the configuration of the transmission unit.

FIG. 4A is a ray diagram schematically showing an optical operation of the transmission unit in an orthogonal direction orthogonal to the scanning direction

FIG. 5 is a ray diagram schematically showing an optical operation of a modification of the projection optical system.

FIG. 6 is a diagram schematically showing another example of the configuration of the spatial phase modulation element.

DESCRIPTION OF EMBODIMENTS

Figure 2A:
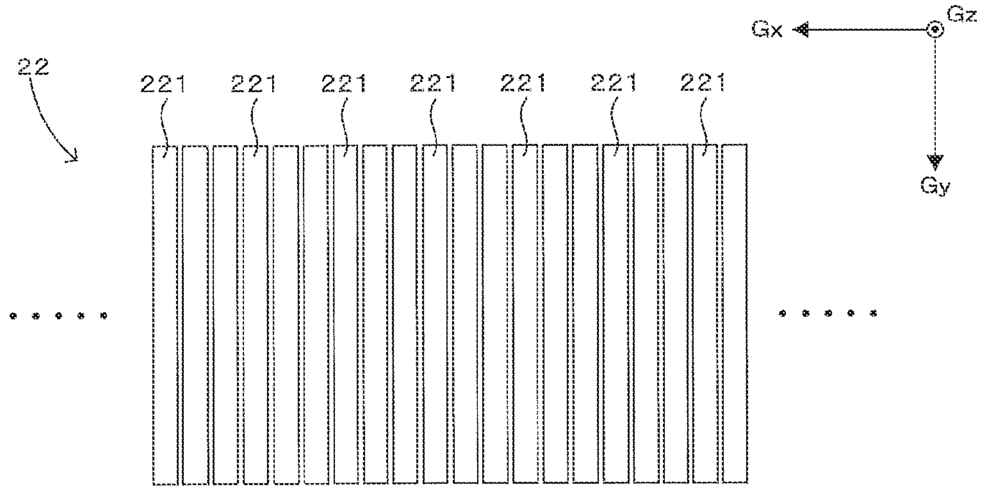
FIG. 2A is a plan view schematically showing the configuration of the grating light valve.

FIG. 1 is a block diagram showing an object recognition apparatus according to the invention. The object recognition apparatus 1 of FIG. 1 measures a distance to an object J present in the surrounding and recognizes an existence range of the object J by scanning the surrounding. This object recognition apparatus 1 is provided with a transmission unit 2 that transmits a measurement light beam Lm to the object J, a reception unit 6 that receives the measurement light beam Lm reflected by the object J and a controller 9 that controls the transmission unit 2 and the reception unit 6.

The transmission unit 2 includes a wavelength-swept light source 21 that emits a light beam whose wavelength is continuously changing, and a spatial phase modulation element 22 that performs phase modulation for the measurement light beam Lm emitted from the wavelength-swept light source 21. The measurement light beam Lm phase-modulated by the spatial phase modulation element 22 is transmitted to the object J.

The reception unit 6 includes a photodetector array 61 having a plurality of photodetectors arrayed in a row, and the measurement light beam Lm reflected by the object J is detected by the photodetector array 61. More particularly, the reception unit 6 generates a combined wave by superimposing a reference light beam Lr received from the transmission unit 2 and the measurement light beam Lm reflected by the object J, and the photodetector array 61 detects this combined wave. This combined wave includes beats generated by the interference of the measurement light beam Lm and the reference light beam Lr.

The controller 9 is constituted by a processor called a CPU (Central Processing Unit), an FPGA (Field Programmable Gate Array) or the like. This controller 9 controls the emission of the measurement light beam Lm and the reference light beam Lr from the wavelength-swept light source 21 and phase modulation by the spatial phase modulation element 22. Further, the controller 9 calculates the distance to the object J based on the beats included in the combined wave of the measurement light beam Lm and the reference light beam Lr detected by the photodetector array 61.

Figure 2B:
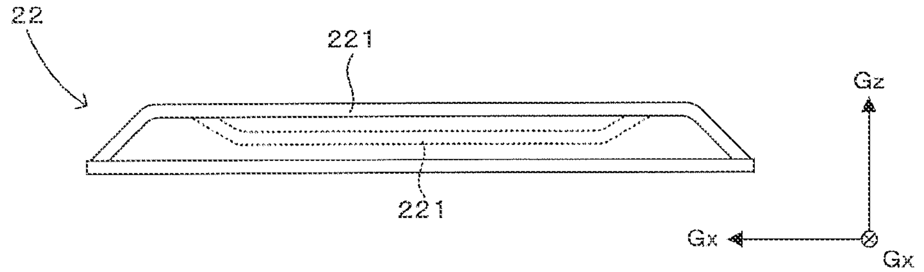
FIG. 2B is a side view schematically showing the configuration of the grating light valve.
Figure 2C:
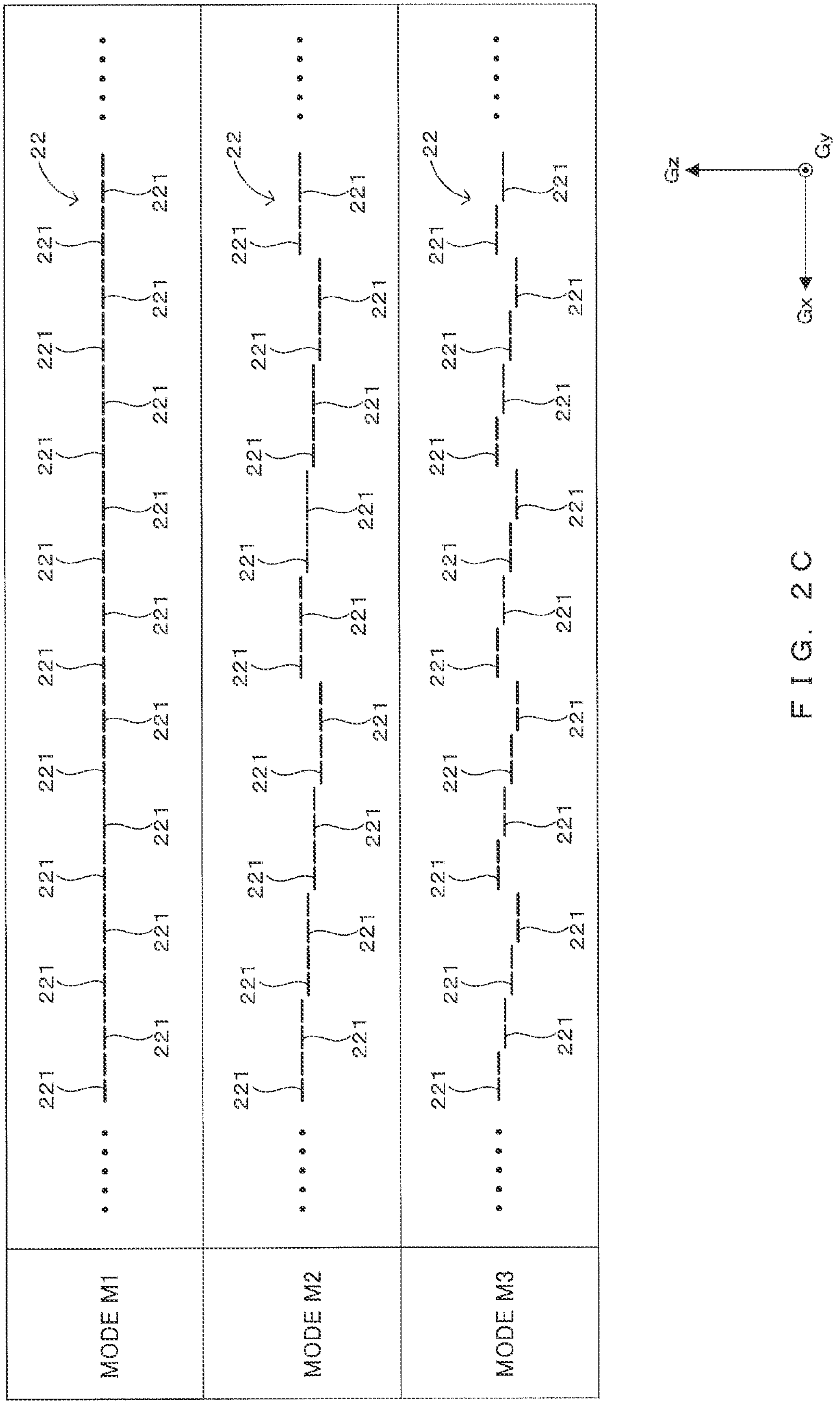
FIG. 2C is a chart schematically showing the operation of the grating light valve.

The spatial phase modulation element 22 used in this object recognition apparatus 1 is, for example, a grating light valve shown in FIGS. 2A, 2B and 2C. Here, FIG. 2A is a plan view schematically showing the configuration of the grating light valve, FIG. 2B is a side view schematically showing the configuration of the grating light valve, and FIG. 2C is a chart schematically showing the operation of the grating light valve.

The spatial phase modulation element 22 includes a plurality of ribbons 221 arrayed in a direction Gx. As shown in FIG. 2A, the ribbon 221 as a constituent element has a rectangular shape short in the direction Gx and long in a direction Gy in a plan view. Here, the direction Gy is orthogonal to the direction Gx. The ribbon 221 is flexible, and a surface thereof functions as a reflection surface for regularly reflecting a light beam. The ribbon 221, which is not deflected, and the deflected ribbon 221 (broken line) are shown together in FIG. 2B. In this way, the ribbon 221 is displaced in a direction Gz by being deflected. Here, the direction Gz is orthogonal to the directions Gx and Gy. The spatial phase modulation element 22 deflects the ribbon 221 by an electrostatic force corresponding to a signal from the controller 9, thereby displacing the ribbon 221 by a displacement amount represented by the signal. This enables the plurality of ribbons 221 to be displaced in many modes.

This point is described using an example shown in FIG. 2C. In a mode M1, the displacement amounts of the plurality of ribbons 221 are equal and zero and the spatial phase modulation element 22 functions as a mirror. In modes M2 and M3, the displacement amounts of the ribbons 221 cyclically change in the direction Gx and the spatial phase modulation element 22 functions as a brazed diffraction grating. That is, the spatial phase modulation element 22 reflects the measurement light beam Lm at an angle corresponding to a cycle of the displacement amounts of the ribbons 221. Note that, in the modes M2 and M3, the cycle of the displacements of the ribbons 221 is different and the angle at which the measurement light beam LM is reflected by the spatial phase modulation element 22 is different. Therefore, the spatial phase modulation element 22 can scan the measurement light beam Lm in a scanning direction by changing the displacement cycle of the plurality of ribbons 221.

Figure 4B:
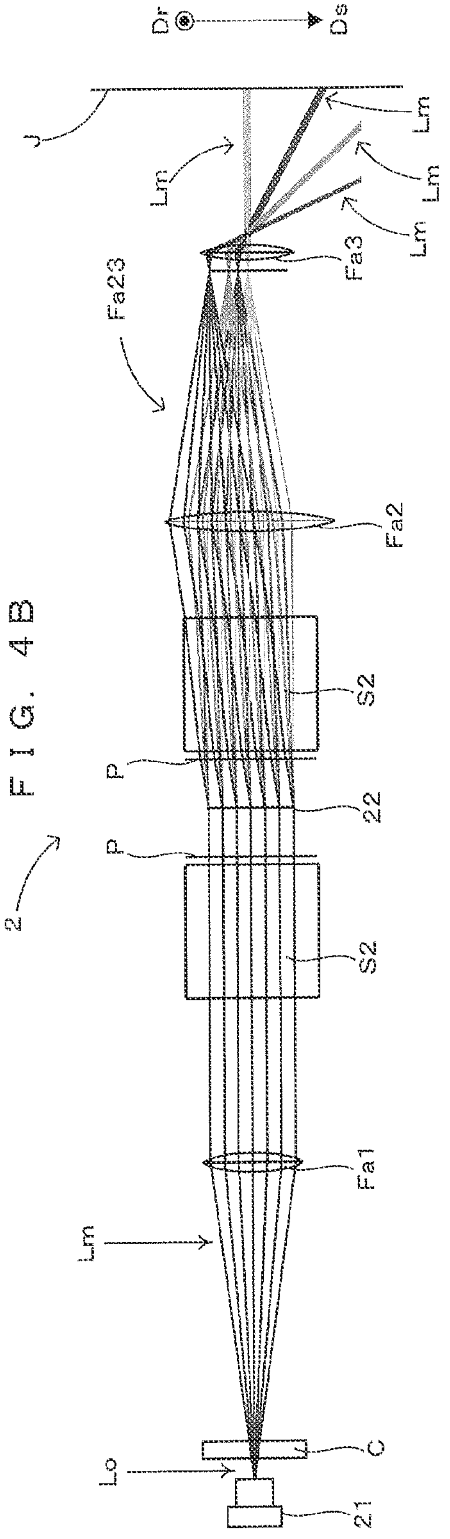
FIG. 4B is a ray diagram schematically showing an optical operation of the transmission unit in the scanning direction.

FIG. 3 is a perspective view schematically showing the configuration of the transmission unit, FIG. 4A is a ray diagram schematically showing an optical operation of the transmission unit in an orthogonal direction orthogonal to the scanning direction, and FIG. 4B is a ray diagram schematically showing an optical operation of the transmission unit in the scanning direction. Note that the configuration of the reception unit is shown together in FIG. 4A.

First, an operation in the orthogonal direction Dr is described. The wavelength-swept light source 21 emits a wavelength-swept light beam Lo whose wavelength is continuously changing in response to a command from the controller 9. From a viewpoint from a scanning direction Ds shown in FIG. 4A (in other words, in the orthogonal direction Dr), the wavelength-swept light beam Lo emitted from the wavelength-swept light source 21 is collimated by a cylindrical lens C. The thus collimated wavelength-swept light beam Lo is split into a reference light beam Lr and a measurement light beam Lm by a beam splitter S1. In this way, the reference light beam Lr whose wavelength is continuously changing similarly to the measurement light beam Lm is generated. This reference light beam Lr is transmitted from the transmission unit 2 to the reception unit 6 and used to generate beats to be described later.

On the other hand, the measurement light beam Lm is imaged on the spatial phase modulation element 22 by a lens Fa1 in the viewpoint from the scanning direction Ds shown in FIG. 4A. In an example here, the scanning direction Ds corresponds to the direction Gx and the orthogonal direction Dr corresponds to the direction Gy (FIGS. 2, 4A and 4B). Therefore, the measurement light beam Lm is condensed in the direction Gy and imaged in a center of each ribbon 221.

Incidentally, as shown in FIG. 3, a polarizing beam splitter S2 and a quarter-wave plate P are arranged between the lens Fa1 and the spatial phase modulation element 22. Accordingly, the measurement light beam Lm emitted from the lens Fa1 is reflected by the polarizing beam splitter S2 and bent at a right angle toward the spatial phase modulation element 22. The measurement light beam Lm reflected by the polarizing beam splitter S2 in this way is incident on the spatial phase modulation element 22 after being rotated by a quarter wavelength as passing through the quarter wave plate P.

The measurement light beam Lm incident on the spatial phase modulation element 22 is reflected toward a quarter wave plate P and a polarizing beam splitter S2 by the spatial phase modulation element 22. Accordingly, the measurement light beam Lm is incident on the polarizing beam splitter S2 after being further rotated by a quarter wavelength as passing through the quarter wave plate P. Since the measurement light beam Lm is rotated by a half wavelength by passing through the quarter wave plate P twice, the measurement light beam Lm incident on the polarizing beam splitter S2 passes through the polarizing beam splitter S2 and propagates toward a projection optical system Fa23 having lenses Fa2, Fa3. Note that the return of the beam through the reflection-type spatial phase modulation element 22 is not shown to facilitate description in FIGS. 4A and 4B.

In the viewpoint from the scanning direction Ds shown in FIG. 4A, the measurement light beam Lm reflected by the spatial phase modulation element 22 is imaged by the lens Fa3 after being collimated by the lens Fa2. An imaging point where the measurement light beam Lm is imaged by the lens Fa3 is located between the lens Fa3 and the object J. Thus, the measurement light beam Lm is incident on the object J while spreading in the orthogonal direction Dr. As just described, the projection optical system Fa23 shapes the measurement light beam Lm spreading in the orthogonal direction Dr and irradiates the shaped measurement light beam Lm to the object J.

Next, an operation in the scanning direction Ds is described. The cylindrical lens C has no power in the scanning direction Ds and, in a viewpoint from the orthogonal direction Dr shown in FIG. 4A (in other words, in the scanning direction Ds), the wavelength-swept light beam Lo emitted from the wavelength-swept light source 21 propagates without being refracted by the cylindrical lens C and is incident as the measurement light beam Lm on the lens Fa1.

In the viewpoint from the orthogonal direction Dr, the measurement light beam Lm incident on the lens Fa1 is incident on the spatial phase modulation element 22 after being collimated by the lens Fa1. That is, the measurement light beam Lm is incident on the spatial phase modulation element 22 in a state imaged in the orthogonal direction Dr as described above while being collimated in the scanning direction Ds. Therefore, the measurement light beam Lm extending in parallel to the direction Gx is imaged in a center of the spatial phase modulation element 22 in the direction Gy.

On the other hand, the spatial phase modulation element 22 performs phase modulation for the measurement light beam Lm by displacing the plurality of ribbons 221 in a mode corresponding to a command from the controller 9. Thus, the measurement light beam Lm incident on the spatial phase modulation element 22 is reflected by the spatial phase modulation element 22 at an angle corresponding to the displacement mode of the plurality of ribbons 221. The measurement light beams Lm reflected at four different angles by the spatial phase modulation element 22 are shown together in FIG. 4B. In this way, the measurement light beam Lm reflected by the spatial phase modulation element 22 is incident on the lens Fa2.

Incidentally, the polarizing beam splitter S2 and the quarter-wave plate P are arranged between the lens Fa1 and the spatial phase modulation element 22 as described above. Accordingly, the measurement light beam Lm is incident on the spatial phase modulation element 22 from the polarizing beam splitter S2 by way of the quarter wave plate P. Further, the measurement light beam Lm is incident on the polarizing beam splitter S2 from the spatial phase modulation element 22 by way of the quarter wave plate P. The details of functions of these polarizing beam splitter S2 and quarter wave plate P are as described above.

In the viewpoint from the orthogonal direction Dr shown in FIG. 4B, the measurement light beam Lm reflected by the spatial phase modulation element 22 is collimated by the lens Fa3 after being imaged by the lens Fa2. As shown in FIG. 4B, the projection optical system Fa23 having the lenses Fa2, Fa3 narrows a width of the measurement light beam Lm emitted from the spatial phase modulation element 22. Further, as described above, the projection optical system Fa23 spreads the measurement light beam Lm in the orthogonal direction Dr. That is, the projection optical system Fa23 shapes the measurement light beam Lm into a straight line wide in the orthogonal direction Dr and narrow in the scanning direction Ds and irradiates the shaped measurement light beam Lm to the object J.

In such a configuration, if the spatial phase modulation element 22 changes the reflection angle of the measurement light beam Lm, the measurement light beam Lm linearly extending in the orthogonal direction Dr is scanned across the object J in the scanning direction Ds. Note that, as shown in FIG. 4B, the projection optical system Fa23 widens the reflection angle of the measurement light beam Lm by the spatial phase modulation element 22. In this way, a wide scanning range of the measurement light beam Lm is ensured.

The above is the details of the transmission unit 2. Next, the reception unit 6 is described. The measurement light beam Lm reflected by the object J is incident on the reception unit 6 provided separately from the transmission unit 2 without returning to the transmission unit 2. This reception unit 6 includes the photodetector array 61, a light-combining element array 63, a microlens array 65 and a camera lens 67. The measurement light beam Lm reflected by the object J is introduced to the microlens array 65 by the camera lens 67. Then, the measurement light beam Lm transmitted through the microlens array 65 is incident on the photodetector array 61 by way of the light-combining element array 63.

The photodetector array 61 includes a plurality of photodetectors 611 arrayed in a row in an array direction A. In contrast, the light-combining element array 63 includes a plurality of light-combining elements 631 arrayed in a row in the array direction A to correspond to the plurality of photodetectors 611, and the microlens array 65 includes a plurality of microlenses 651 arrayed in a row in the array direction A to correspond to the plurality of photodetectors 611. Note that it goes without saying that the number of the photodetector arrays 61 is not limited to the number shown in FIG. 4A.

The array direction A corresponds to the orthogonal direction Dr and the linear measurement light beam Lm reflected by the object J is irradiated to the plurality of microlenses 651 along the array direction A. Then, the measurement light beam Lm transmitted through the plurality of microlenses 651 reaches the plurality of photodetectors 611 by way of the plurality of light-combining elements 631.

In particular, the microlens 651 images the incident measurement light beam Lm toward the corresponding photodetector array 61. Further, the reference light beam Lr split from the wavelength-swept light beam Lo by the beam splitter S1 is transmitted to each light-combining element 631, and the light-combining element 631 superimposes the measurement light beam Lm to be imaged on the corresponding photodetector 611 and the reference light beam Lr and emits the superimposed light beam toward the photodetector 611. In this way, the photodetector 611 detects a combined wave of the measurement light beam Lm and the reference light beam Lr. This combined wave includes beats generated by the interference of the measurement light beam Lm and the reference light beam Lr, and the controller 9 calculates a distance to the object J based on these beats.

Incidentally, as described above, wavelength sweep of continuously changing a wavelength is performed for the measurement light beam Lm and the reference light beam Lr. This wavelength sweep is an operation of continuously changing the wavelength from a long wavelength to a short wavelength or continuously changing the wavelength from a short wavelength to a long wavelength. While the wavelength sweep is being performed, the spatial phase modulation element 22 stops the plurality of ribbons 221 in a displacement mode corresponding to the reflection angle (scanning angle) of the measurement light beam Lm. The scanning angle is changed by changing the displacement mode of the plurality of ribbons 221 before the next wavelength sweep is started after this wavelength sweep is completed.

In the embodiment described above, the spatial phase modulation element 22 including the plurality of ribbons 221 is used. This spatial phase modulation element 22 is a so-called grating light valve for modulating the phase of light by displacing the ribbons 221. If the measurement light beam Lm (measurement light) is incident on such a spatial phase modulation element 22, the measurement light beam Lm is emitted in a direction corresponding to the displacement mode of the ribbons 221. That is, an emission direction of the measurement light beam Lm can be changed, and the measurement light beam Lm can be scanned across the object J by controlling the displacement mode of the ribbons 221. At this time, the measurement light beam Lm phase-modulated by the spatial phase modulation element 22 is projected to the object J after being shaped into a linear beam. That is, the linear measurement light beam Lm is scanned across the object J. To correspond to this, the plurality of linearly arrayed photodetectors 611 are provided, and the linear measurement light beam Lm reflected by the object J is detected by the plurality of photodetectors 611. Therefore, the measurement light beam Lm can be scanned at once for detection for a range having a length of the linear measurement light beam Lm and a scanning width of the measurement light beam Lm. In this way, it is possible to suppress a time required for two-dimensional scanning of light.

Further, the following advantages can be expected by scanning light by a grating light valve. That is, if an attempt is made to scan the measurement light beam Lm using a MEMS mirror, a possibility that it becomes difficult to properly scan the measurement light beam Lm is assumed due to the rotation of the MEMS mirror during a period in which the wavelength of the measurement light beam Lm is continuously changing. In contrast, the grating light valve has no such possibility since the grating light valve can precisely stop the ribbons 221 in the displacement mode corresponding to the scanning angle while a wavelength of the measurement light beam Lm is swept. Further, since the ribbons 221 can be operated at 100 kHz or higher and changed at a relatively high speed, the measurement light beam Lm can be scanned at a high speed by instantaneously changing the displacement mode of the ribbons 221. As a result, it can be expected that the time required for two-dimensional scanning of the measurement light beam Lm can be more reliably suppressed.

Further, the projection optical system Fa23 projects the measurement light beam Lm linearly extending in the orthogonal direction Dr to the object J by collimating the measurement light beam Lm in the viewpoint from the orthogonal direction Dr while spreading the measurement light beam Lm in the orthogonal direction Dr (extending direction). In this way, the linear measurement light beam Lm constituted by collimated light can be scanned across the object J.

Further, the reception unit 6 (light receiver) includes the plurality of microlenses 651 (lenses) linearly arrayed to respectively correspond to the plurality of photodetectors 611, and the measurement light beam Lm reflected by the object J is incident on the plurality of microlenses 651. The microlens 651 introduces the incident measurement light beam Lm to the corresponding photodetector 611. In such a configuration, the linear measurement light beam Lm reflected by the object J can be precisely introduced to each of the plurality of photodetectors 611.

The reception unit 6 further includes the plurality of light-combining elements 631 (light combiners) linearly arrayed to respectively correspond to the plurality of photodetectors 611. This light-combining element 631 introduces the measurement light beam Lm and the reference light beam Lr to the corresponding photodetector 611 after superimposing the reference light beam (reference light) on the measurement light beam Lm transmitted through the microlens 651 corresponding to the same photodetector 611. In such a configuration, the linear measurement light beam Lm reflected by the object J can be precisely introduced to each of the plurality of photodetectors 611 while being superimposed on the reference light beam Lr.

Further, in the spatial phase modulation element 22, the plurality of ribbons 221 are arrayed in the direction Gx (array direction) and shaped to extend in the direction Gy (longitudinal direction). In contrast, the lens Fa1 (irradiation optical system) is arranged between the wavelength-swept light source 21 and the spatial phase modulation element 22. This lens Fa1 converges the measurement light beam Lm to the spatial phase modulation element 22 in the direction Gy and collimates the measurement light beam Lm to the spatial phase modulation element 22 in a viewpoint from the direction Gy. Since the measurement light beam Lm is converged to the plurality of ribbons 221 of the spatial phase modulation element 22 in this way, the measurement light beam Lm can be narrowed to ranges (central parts) of the ribbons 221 whose displacements are controlled with relatively high accuracy, and the measurement light beam Lm can be precisely emitted in a desired direction from the spatial phase modulation element 22.

In the embodiment described above, the object recognition apparatus 1 corresponds to an example of an "object recognition apparatus" of the invention, the transmission unit 2 and the reception unit 6 correspond to an example of an "optical scanning apparatus" of the invention, the wavelength-swept light source 21 and the beam splitter S1 constitute a "wavelength-swept light generator" of the invention, the spatial phase modulation element 22 corresponds to an example of a "spatial phase modulation element" of the invention, the ribbon 221 corresponds to an example of a "grating element" of the invention, the reception unit 6 corresponds to an example of a "light receiver" of the invention, the photodetector 611 corresponds to an example of a "photodetector" of the invention, the light-combining element 631 corresponds to an example of a "light combiner" of the invention, the microlens 651 corresponds to an example of a "lens" of the invention, the controller 9 corresponds to an example of a "controller" of the invention, the orthogonal direction Dr corresponds to an example of an "extending direction" of the invention, the lens Fa1 corresponds to an example of an "irradiation optical system" of the invention, the projection optical system Fa23 corresponds to an example of a "projection optical system" of the invention, the direction Gx corresponds to an example of an "array direction" of the invention, the direction Gy corresponds to an example of a "longitudinal direction" of the invention, the object J corresponds to an example of an "object" of the invention, the reference light beam Lr corresponds to an example of "reference light" of the invention, and the measurement light beam Lm corresponds to an example of "measurement light" of the invention.

Note that the invention is not limited to the embodiment described above and various changes other than the aforementioned ones can be made without departing from the gist of the invention. For example, the above projection optical system Fa23 widens the scanning angle of the measurement light beam Lm by imaging the measurement light beam Lm before the object J. However, the projection optical system may be configured as in FIG. 5. Here, FIG. 5 is a ray diagram schematically showing an optical operation of a modification of the projection optical system. In FIG. 5, measurement light beams Lm projected at four different scanning angles are respectively shown together. This projection optical system Fb14 includes four lenses Fb1 to Fb4 for respectively widening the angle of the measurement light beam Lm.

Further, the polarizing beam splitters S2 and the quarter wave plates P are not essential. Therefore, the transmission unit 2 may be configured without providing the polarizing beam splitters S2 and the quarter wave plates P.

Further, a generation method of the reference light beam Lr is not limited to that of the above embodiment. For example, in the viewpoint from the orthogonal direction Dr shown in FIG. 4B, the reference light beam Lr may be generated by a beam splitter for splitting the reference light beam Lr from the measurement light beam Lm.

Further, although the grating light valve is described as an example of the spatial phase modulation element 22 in the above example, there is no limitation to this, and a planar light valve may be adopted. The planar light valve is described using FIG. 6.

FIG. 6 is a diagram schematically showing the planar light valve as another example of the configuration of the spatial phase modulation element 22. The planar light valve 22 includes a plurality of substantially rectangular reflection elements 223 (grating elements) adjacently arranged in a matrix on an unillustrated substrate. Surfaces of the plurality of reflection elements 223 serve as a modulation surface. In an example shown in FIG. 6, M reflection elements 223 are arranged in a vertical direction and N reflection elements 223 are arranged in a horizontal direction.

Each reflection element 223 includes a fixed member 224 and a movable member 225. The fixed member 224 is a planar and substantially rectangular member fixed to the substrate and is provided with a substantially circular opening in a center. The movable member 225 is a substantially circular member provided in the opening of the fixed member 224. A fixed reflection surface is provided on the upper surface (i.e. surface on a front side in a direction perpendicular to the plane of FIG. 6) of the fixed member 224. A movable reflection surface is provided on the upper surface of the movable member 225. The movable member 225 is movable in the direction perpendicular to the plane of FIG. 6.

In the reflection element 223, relative positions of the fixed member 224 and the movable member 225 are displaced by a displacement amount represented by a signal from the controller 9. At this time, the displacement amounts of the movable members 225 are equal in the respective reflection elements 223 arranged in the vertical direction. That is, the displacement amounts are controlled by one column unit (unit in the vertical direction). Therefore, the planar light valve 22 functions as a brazed diffraction grating by cyclically changing the displacements of the movable members 225 by the column unit in the horizontal direction in a case of the modes 2, 3 described above.

Note that, in the case of adopting such a planar light valve, an optical system for shaping light incident on the spatial phase modulation element 22 into rectangular light of M×N size and an optical system for integrating reflected light from the reflection elements 223 arranged in one column in the vertical direction and shaping the reflected light into a linear measurement light beam are mounted.

Even if the planar light valve is applied as the spatial phase modulation element 22 as described above, measurement light can be scanned at once for detection across a range having a length of the linear measurement light and a scanning width of the measurement light. In this way, it is possible to suppress a time required for two-dimensional scanning of light.

The present invention is applicable to optical scanning techniques in general for scanning light.

Reference Signs List

1 . . . object recognition apparatus
2 . . . transmission unit (optical scanning apparatus)
21 . . . wavelength-swept light source (wavelength-swept light generator)
22 . . . spatial phase modulation element
221 . . . ribbon (grating element)
6 . . . reception unit (optical scanning apparatus, light receiver)
661 . . . photodetector
631 . . . light-combining element (light combiner)
651 . . . microlens (lens)
9 . . . controller
Dr . . . orthogonal direction (extending direction)
Fa1 . . . lens (irradiation optical system)
Fa23 . . . projection optical system (projection optical system)
Gx . . . direction (array direction)
Gy . . . direction (longitudinal direction)
J . . . object
Lr . . . reference light beam (reference light)
Lm . . . measurement light beam (measurement light)
S1 . . . beam splitter (wavelength-swept light generator)

The invention claimed is:

1. An optical scanning apparatus comprising:
a wavelength-swept light generator that generates reference light and measurement light each having a wavelength continuously changing;
a spatial phase modulation element including a plurality of grating elements reflecting the measurement light, the spatial phase modulation element performing phase modulation for the measurement light by displacing the grating elements;
a projection optical system that projects the measurement light linearly extending to an object by shaping the measurement light phase-modulated by the spatial phase modulation element into linear shape; and
a light receiver including a plurality of linearly arrayed photodetectors, the light receiver introducing the measurement light reflected by the object to the plurality of photodetectors,
the light receiver introducing the measurement light superimposed on the reference light to the plurality of photodetectors,
the plurality of photodetectors detecting the superimposed reference light and measurement light, and
the spatial phase modulation element scanning the measurement light across the object by controlling a displacement of each of the plurality of grating elements, wherein:
the light receiver further includes a plurality of light combiners linearly arrayed to respectively correspond to the plurality of photodetectors, and
the light combiner introduces the measurement light and the reference light to the corresponding photodetector after superimposing the reference light on the measurement light transmitted through a lens corresponding to the same photodetector.

2. An optical scanning apparatus comprising:
wavelength-swept light generator that generates reference light and measurement light each having a wavelength continuously changing;
a spatial phase modulation element including a plurality of grating elements reflecting the measurement light, the spatial phase modulation element performing phase modulation for the measurement light by displacing the grating elements;
a projection optical system that projects the measurement light linearly extending to an object by shaping the measurement light phase-modulated by the spatial phase modulation element into linear shape,
a light receiver including a plurality of linearly arrayed photodetectors, the light receiver introducing the measurement light reflected by the object to the plurality of photodetectors; and
an irradiation optical system provided between the wavelength-swept light generator and the spatial phase modulation element, the light receiver introducing the measurement light superimposed on the reference light to the plurality of photodetectors, the plurality of photodetectors detecting the superimposed reference light and measurement light, and the spatial phase modulation element scanning the measurement light across the object by controlling a displacement of each of the plurality of grating elements, wherein:

the plurality of grating elements are arrayed in an array direction, the grating element is shaped to extend in a longitudinal direction orthogonal to the array direction, and the irradiation optical system converges the measurement light to the spatial phase modulation element in the longitudinal direction and collimates the measurement light to the spatial phase modulation element in a viewpoint from the longitudinal direction.

3. An object recognition apparatus, comprising:

the optical scanning apparatus according to claim 1; and a controller that calculates a positional relationship with an object based on a detection result of the plurality of photodetectors provided in the optical scanning apparatus.

4. The optical scanning apparatus according to claim 1, wherein:

while a wavelength sweep of continuously changing a wavelength is performed, the spatial phase modulation element stops displacements of the plurality of grating elements.

5. The optical scanning apparatus according to claim 1, wherein:

the projection optical system widens a reflection angle of the measurement light by the spatial phase modulation element.

6. The optical scanning apparatus according to claim 1, wherein:

the projection optical system projects the measurement light linearly extending in an extending direction by collimating the measurement light in a viewpoint from the extending direction while spreading the measurement light in the extending direction.

7. The optical scanning apparatus according to claim 1, wherein:

the light receiver includes a plurality of lenses linearly arrayed to respectively correspond to the plurality of photodetectors, the measurement light reflected by the object is incident on the plurality of lenses, and the lens introduces the incident measurement light to the corresponding photodetector.

* * * * *